May 26, 1964 S. L. KERR 3,134,393
AIR AND VACUUM VALVE APPARATUS
Filed June 22, 1962 2 Sheets-Sheet 1
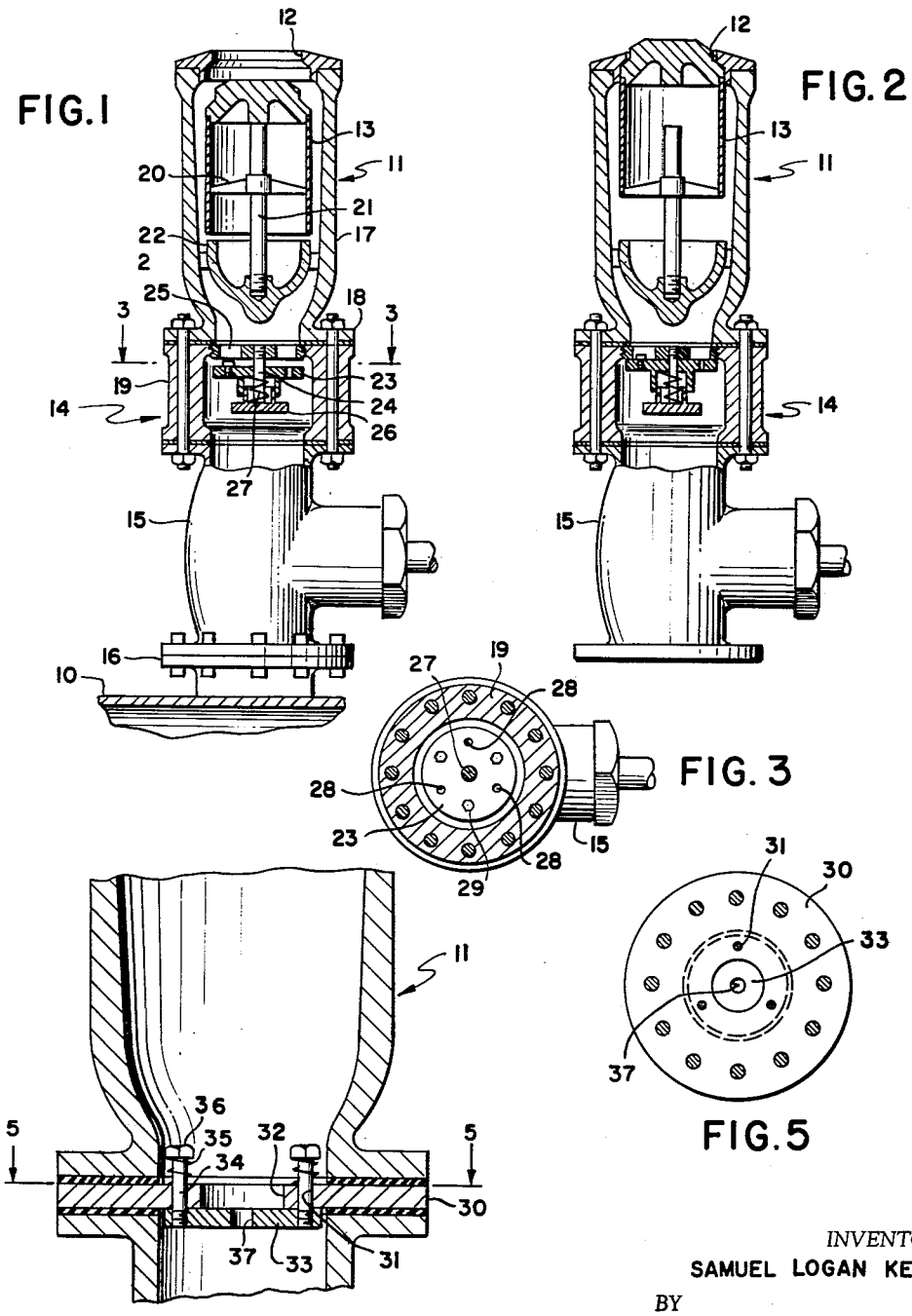
INVENTOR.
SAMUEL LOGAN KERR
BY
Adams, Forward and McLean
ATTORNEYS May 26, 1964 S. L. KERR 3,134,393
AIR AND VACUUM VALVE APPARATUS
Filed June 22, 1962 2 Sheets-Sheet 2
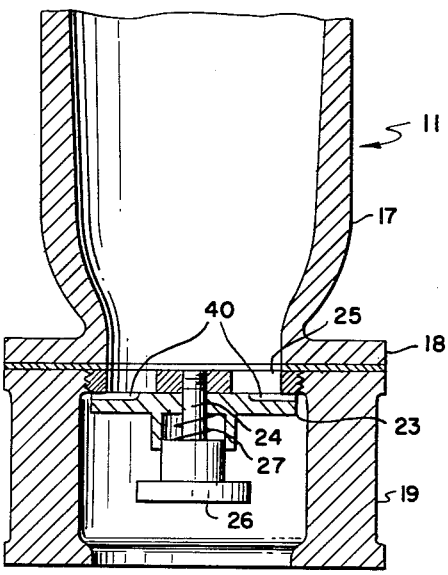
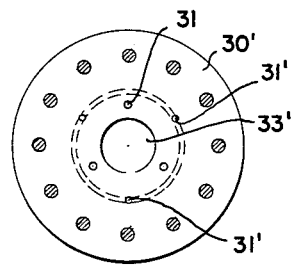
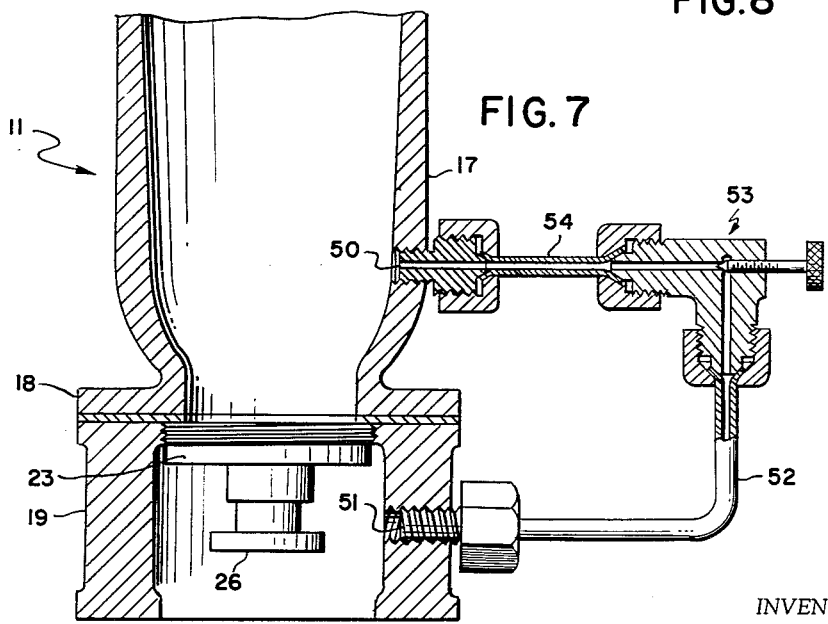
INVENTOR.
SAMUEL LOGAN KERR
BY
Adams, Forward and McLean
ATTORNEYS United States Patent Office 3,134,393
Patented May 26, 1964

3,134,393
AIR AND VACUUM VALVE APPARATUS
Samuel Logan Kerr, P.O. Box 6, Flourtown, Pa.
Filed June 22, 1962, Ser. No. 204,588
6 Claims. (Cl. 137—202)

My invention relates to fluid transportation, and in particular to pipe lines of the thin wall type such as are conventionally employed as water lines, and has as its particular object the provision of apparatus in connection with such pipe lines in which air and vacuum valves are employed such that chatter and wear of the air and vacuum valves caused by water hammer will be substantially diminished.

As is well known, thin wall pipe lines employed in the transportation of irrigation water and the like usually are provided with air inlets at intervals along the length of the pipe line because the rise and fall of the pipe line with the topography of the area through which it passes require the admission of air into the pipe line in the event of a loss in pressure in the pipe line to prevent possible collapse of the pipe line. Such pressure loss is typically caused by shutting down the pump, opening of discharge valves or occurrence leaks. Such air inlets can also be required, for example, to accommodate changes in grade of the pipe line on downhill runs which could cause a vacuum to form.

Conventionally such air inlets are formed by installing air and vacuum valves in the pipe line at the critical points. Such valves are typically ball, bucket or other float type valves having an air inlet from the atmosphere which is sealed by water rising in the valve seating the float against the air inlet. Such valves are quite satisfactory on gravity feed lines and for penstock use. When, however, substantial rises and falls of the water line require relatively higher pressure operation, and hence the use of high discharge pressure pumps, it has been found that pressure changes caused by shutting down or starting up the pump, sudden opening of valves and the like are sufficient to cause operation of the air and vacuum valves employed. Such operation results in rapid opening and slamming shut of the valves and occasionally in chatter induced by consequent water hammer.

Thus, to illustrate, the displacement in a typical six inch valve between fully open and fully closed positions is approximately 0.30 gallon. The maximum rate of water discharge with typical coefficient of 0.6 at 40 p.s.i.g. gauge is 4075 gallons per minute. It will be seen that full closure of the valve, as might occur on start up of pumping, will take place in a small fraction of a second probably less than 0.02 second. Under such circumstances, the air and vacuum valve will slam shut cutting off flow at a rapid rate setting up a severe water hammer in the line inducing the particular valve, as well as other valves along the line, to chatter and consequently wearing the valve and valve seat unduly.

It is essentially the object of my invention to provide an apparatus at such an air and vacuum valve installation which, although permitting rapid opening of the valve required to admit air into the line at the rate for which the valve was designed, will nevertheless restrict air outlet through the valve and thus slow the closing of the valve to reasonably tolerable rates. In accordance with this object I provide a check valve, which is connected between the air and vacuum valve and the pipe line and which is normally closed to passage of air and water from the pipe line out through the air and vacuum valve but which releases to admit air into the pipe line through the air and vacuum valve upon a loss of pressure in the pipe line. In addition I provide an arrangement by-passing the check valve which will permit restricted fluid communication between the pipe line and air and vacuum valve when the check valve is closed. Such a by-pass specifically can be a separate conduit built about the check valve but preferably is formed by aperturing the valve element of the check valve, or by aperturing the seat of the check valve.

Thus if a six inch check valve is employed between a six inch air and vacuum valve and a pipe line, as described above, and the check valve element is provided with an aperture $\frac{1}{16}$ inch in diameter, again a typical coefficient of 0.6 and 40 p.s.i.g., while the check valve will open and permit relatively free entrance of air into the pipe line upon a loss in water pressure, repressuring of the pipe line and consequent closing of the check valve restricts the flow of water from the pipe line into the air and vacuum valve to a rate of 0.474 gal. per minute. The 0.30 gallon required to lift the float to closed position and close the air and vacuum valve will do so in about 38.1 seconds. Quite evidently, greater by-pass areas can be employed for shorter closing times and smaller area by-passes can be employed for slower closing times.

For a more complete understanding of the practical application of my invention, reference is made to the appended drawings in which:

FIGURE 1 is an elevation shown partly in section of a pipe line on which is mounted an air and vacuum valve provided with an apparatus in accordance with my invention;

FIGURE 2 is a view similar to FIGURE 1 showing a different operative position of the air and vacuum valve;

FIGURE 3 is a horizontal section taken at the plane of line 3—3 of FIGURE 1;

FIGURE 4 is a fragmentary enlarged vertical section corresponding to a portion of the apparatus shown in FIGURES 1 and 2 illustrating a modification of such arrangement;

FIGURE 5 is a horizontal section taken in the plane of line 5—5 in FIGURE 4;

FIGURE 6 is a view similar to FIGURE 4 showing a different modification of the device in accordance with my invention;

FIGURE 7 is a view similar to FIGURE 4 showing still another modification of the device in accordance with my invention; and FIGURE 8 is a horizontal section similar to that of FIGURE 5 but illustrating yet another modification.

Referring more particularly to FIGURES 1 and 2 the reference number 10 designates a pipe line of the thin wall type conventionally employed in the transportation of water, for example, leading to irrigation projects. The illustrated portion of pipe line 10 is located at a point in the pipe line, such as at the top of a hill, where it is essential an air inlet be provided to permit the admission of air into the pipe line when it is not under pumping pressure. Such an air inlet is typically provided by an air and vacuum valve 11, the upper end of which is provided with an opening 12 to the atmosphere. The underside of opening 12 defines a valve seat for the upper end of an inverted bucket type float 13 housed within valve 11. The lower end of valve 11 is especially provided in accordance with my invention with a check valve 14 beneath which is mounted in a conventional manner a gate valve 15 leading to a flanged outlet 16 in pipe line 10 on which valve 15 is mounted supporting valves 14 and 11 above it.

More specifically air and vacuum valve 11 includes an open ended approximately cylindrical housing 17 mounted in vertical position with its lower open end secured to the open upper end of check valve 14 which is also provided with an open ended, vertically positioned, cylindrical housing 19.

In a conventional manner bucket float 13 of air and vacuum valve 11 is in the shape of an inverted bucket the closed top of which is adapted to seat against the under edge of upper end 12 of housing 17. A spider 20 having a vertically bored hub at its center is mounted transversely within bucket 13 with the hub of spider 20 receiving and affixed to an upright post 21 which is affixed at its lower end in the bottom of a cup 22 mounted in fixed position in housing 17 beneath float 13. The outer ends of spider 20 are in sliding contact with the inside of the side walls of bucket 13. Generally, in conventional manner, the open upper and lower ends of housing 17 are of equal cross-sectional areas and are equal to the cross-sectional annular area between housing 17 and cup 22 and between the housing 17 and bucket float 13 at any vertical position in valve 11.

Check valve 14 is of generally conventional construction and typically, as shown in FIGURES 1 and 2, includes a disc 23 mounted for vertical sliding movement on a guide rod 24 the upper end of which is affixed in the center of a spider 25 fixed across the upper end of housing 19. The lower end of rod 24 has a cap 26 between which and disc 23 a loose coil spring 27 is retained about rod 24 tending to urge disc 23 against a valve seat defined in the under edge of the upper opening of housing 19. Thus check valve 14 is closed to upward flow from pipe line 10 to air and vacuum valve 11 but opens upon downward flow into pipe line 10 from air and vacuum valve 11. The tension of spring 27 can be and preferably is at times precompressed to hold check valve 14 closed until a predetermined pressure differential occurs. Alternatively the tension of spring 27 can be reduced to allow the valve disc 23 to rest at a position slightly away from the seat. The flow of air into the pipe line 10 is thus facilitated but the rapid flow outward will lift the disc 23 and force it against the seat. This adjustable feature makes the invention adaptable to high pressure as well as low pressure pipe lines.

In accordance with my invention, check valve 14 is modified, as shown also in FIGURE 3, by the inclusion in the illustrated case of six small tapped apertures through disc 23 of valve 14. In use, some holes 28 are closed by screws 29, the number so closed being selected in the field to accommodate local requirements in closing rate of valve 13. In typical service with an eight inch air and vacuum valve and an eight inch check valve, apertures 28 are ¼ inch in diameter and with these closed by screws 29 provide a closing time of four seconds.

In operation it will be observed gate valve 15 is normally kept open and is employed only when it is necessary to close the valves above it for repair or replacement. When pump pressure is off check valve 14 will normally be closed as shown in FIGURE 2 while air and vacuum valve 11, as shown in FIGURE 1, will be normally open with its bucket 13 dropped down to a position in which the underside of the upper end abuts the upper end of post 21.

When pumping pressure is turned on as the air within the pipe line 10 exhausts out through apertures 28 in check valve 14 and through air and vacuum valve 11 until the water in pipe line 10 having forced all the air out fills the interior of housing 17 causing bucket 13 to float up into a position closing the open upper end 12 of valve 11. The closing operation, since the water flow is through restricted apertures 28, is at a rate sufficiently low to cause slow flotation of bucket 13 and gentle seating in opening 12.

If at any time a momentary loss of pressure occurs, for example, upon the opening of a valve down stream and the pressure drop is sufficient to allow water in valve 11 to fall unseating bucket 13, as shown in FIGURE 1, and also incidentally unseating valve 14, the moment pressure is restored valve 14 reseats thus assuring that the reclosure of bucket 13 will be at the predetermined slow rate avoiding a slamming of bucket 13 against opening 12, possible water hammer and subsequent chatter of valve 11 as well as all the valve 11's on the line.

While I have illustrated the employment of my invention in connection with a bucket air and vacuum valve it will be apparent that the particular type of float of the air and vacuum valve is relatively immaterial. It will also be apparent that a number of variations on the check valve arrangement can be employed. Thus as illustrated in FIGURES 4 and 5 check valve 14 is omitted and in its place is an annular plate 30 sandwiched between the lower end of air and vacuum valve 11 and the upper end of gate valve 15. Plate 30, it will be noted, is provided with three vertical bores 31 disposed at 120° intervals about its central aperture 32. A second centrally apertured plate 33 is mounted beneath plate 30 within the open upper end of valve 15 with the central aperture of plate 33 coaxially positioned relative to the central aperture of plate 30 by means of three guide rods 34 slidably received through apertures 31 affixed at their lower ends in plate 33 and which retain small coil springs 35 between the upper side of plate 30 and heads 36 at the upper ends of rods 34. By restricting the diameter of aperture 37 plate 33 can be made to function as disc 23 in the construction of FIGURES 1 and 2 with the same desirable results.

A further modification is illustrated in FIGURE 6 in which the same reference numerals are employed designate the same parts as in the previous figures. It will be noted that the construction of FIGURE 6 differs from that of the construction of FIGURES 1 and 2 in that apertures 28 are omitted. Instead the upper surface of disc 23 is provided with radial grooves 40. Thus in the closed position grooves 40 cooperate with the seat of valve 14 to define restricted apertures by-passing valve 14 and functioning in the same manner as apertures 28 when valve 14 is closed.

Still another modification is shown in FIGURE 7 in which again the same reference numbers are employed to indicate the same parts shown in FIGURES 1 and 2. The construction of FIGURE 7 differs from that of FIGURES 1 and 2 in that disc 23 has no apertures 28 and in that housing 17 of valve 11 and housing 19 of valve 14 are provided with tapped ports 50 and 51, respectively, in each case at a position below their respective valve elements. Ports 50 and 51, by suitable fittings and pipes 52 and 54 are connected to opposite ends of a needle valve 53 to provide for external adjustment of the closing rate of the vacuum valve 11, by setting the position of valve 53 to give the desired rate of flow. At ports 50 and 51 the internal diameter of the pipe fittings can be made full pipe size or can provide a further restriction to give a maximum closing rate with control valve 53 providing means for reducing the closing time if desired.

Yet another modification is shown in FIGURE 8 in which the same structure is employed as in FIGURES 4 and 5 except plate 30 is replaced by a plate 30' having three additional apertures 31' disposed to register with the clearances between the rim of plate 33' and the wall of housing 19 and plate 33 is replaced by a plate 33' having no aperture 37. In this arrangement the additional apertures 31' do not receive any guide rods and thus function to restrict closing of valve 11 as did aperture 37.

I claim:

1. In the combination of a pipeline and an air and vacuum valve connected to said pipeline, the improvement which includes
    (a) check valve means connected between said air and vacuum valve and said pipeline, said check valve means including
        (i) means defining an aperture positioned between said air and vacuum valve and said pipeline,
        (ii) means at said aperture defining a valve seat,
        (iii) a valve element positioned on the side of said valve seat on the pipeline side thereof and movable between an open position remote from said valve seat and a closed position cooperating with said valve seat, and (iv) resilient means normally biasing said valve element away from said open position substantially to said closed position, said check valve means being thereby normally closed and operable to open position by a pressure on the air and vacuum valve side thereof greater than the pressure on the pipeline side thereof, and (b) means defining a passage of relatively restricted cross-section connected between said air and vacuum valve and said pipeline by-passing said check valve means.

2. The improvement according to claim 1 in which
(a) said means defining a passage includes
(i) an aperture through said valve element.

3. The improvement according to claim 1 in which
(a) said means defining a passage includes a groove between the cooperating surfaces of said element and seat in closed position.

4. The improvement according to claim 1 in which
(a) said means defining a passage includes
(i) a conduit.

5. The improvement according to claim 1 in which
(a) said means defining a passage includes means defining an aperture in said check valve means adjacent said valve element.

6. The improvement according to claim 1 in which
(a) said means defining a passage includes
(i) valve means connected in said passage for controlling flow rate therethrough.

References Cited in the file of this patent
UNITED STATES PATENTS

| | | |
|---|---|---|
| 926,968 | Stickdorn | July 6, 1909 |
| 1,930,568 | Short | Oct. 17, 1933 |
| 2,558,687 | Krueger | June 26, 1951 |